US006827373B2

(12) United States Patent
Zumberge

(10) Patent No.: US 6,827,373 B2
(45) Date of Patent: Dec. 7, 2004

(54) BUSINESS CARD STOCK WITH PEEL OFF LABELS, AND METHOD

(75) Inventor: Gary Zumberge, Edina, MN (US)

(73) Assignee: Capture Business Cards LLC, Edina, MN (US)

( * ) Notice: Subject to any disclaimer, the term of this patent is extended or adjusted under 35 U.S.C. 154(b) by 0 days.

(21) Appl. No.: 09/988,893

(22) Filed: Nov. 19, 2001

(65) Prior Publication Data

US 2002/0079691 A1 Jun. 27, 2002

Related U.S. Application Data

(63) Continuation-in-part of application No. 09/561,066, filed on Apr. 28, 2000, which is a continuation of application No. 09/206,886, filed on Dec. 8, 1998, now Pat. No. 6,179,337, which is a continuation-in-part of application No. 08/986,867, filed on Dec. 8, 1997, now abandoned.

(51) Int. Cl.[7] .............................................. B42D 15/00
(52) U.S. Cl. ............................. 283/81; 40/360; 40/638; 283/101; 283/105; 428/40.1; 428/42.1; 428/43
(58) Field of Search .................... 283/81, 100, 101, 283/105; 40/360, 630, 638; 428/40.1, 41.7, 41.8, 42.1, 42.2, 42.3, 43; 462/8, 25

(56) References Cited

U.S. PATENT DOCUMENTS 2,321,184 A    6/1943  Butterworth
4,028,824 A    6/1977  Miller
4,876,131 A  * 10/1989  Ashby et al. ............... 428/42.3
4,890,862 A    1/1990  Buchholz
4,905,392 A    3/1990  Klein
4,945,218 A    7/1990  Talbott
5,039,652 A  *  8/1991  Doll et al. ................... 503/206
5,098,129 A    3/1992  Haber (List continued on next page.)

FOREIGN PATENT DOCUMENTS

| JP | 61-31777   | 2/1986  |
| JP | 61-168969  | 10/1986 |
| JP | 63-119073  | 8/1988  |
| JP | 64-40680   | 3/1989  |
| JP | 64-44167   | 3/1989  |
| JP | 6-42224    | 6/1994  |
| JP | 3010906    | 3/1995  |
| JP | 7-45060    | 12/1995 |
| JP | 8-104085   | 4/1996  |
| WO | WO87/0132  | 8/1986  |

Primary Examiner—Monica S. Carter
(74) Attorney, Agent, or Firm—Fredrikson & Byron, P.A.

(57) ABSTRACT

A composite business card sheet stock micro perforated to define a plurality of business cards and comprising first and second sheets sandwiching between them a pressure-sensitive adhesive layer. The second sheet is die cut to define a plurality of removable labels, the adhesive remaining with the labels when the latter are peeled from the first sheet. The micro perforations enable the composite business card sheet stock to remain as an integral sheet during a printing operation, but to be easily separated after printing to provide a plurality of business cards with smooth edges, each card having a plurality of removable labels.

18 Claims, 8 Drawing Sheets

U.S. PATENT DOCUMENTS

| | | | |
|---|---|---|---|
| 5,165,726 A | 11/1992 | Talbott | |
| 5,209,514 A | 5/1993 | Herbert | |
| 5,232,248 A | 8/1993 | Talbott | |
| 5,238,269 A * | 8/1993 | Levine | 281/2 |
| 5,257,823 A | 11/1993 | Colvin, Jr. et al. | |
| 5,282,649 A | 2/1994 | Williams et al. | |
| 5,298,010 A * | 3/1994 | Levine | 493/354 |
| 5,299,835 A * | 4/1994 | Sonnenberg | 283/105 |
| 5,308,120 A | 5/1994 | Thompson | |
| 5,318,825 A | 6/1994 | Naber | |
| 5,328,409 A | 7/1994 | Marquardt | |
| 5,332,265 A | 7/1994 | Groess et al. | |
| 5,342,665 A | 8/1994 | Krawitz | |
| 5,352,155 A | 10/1994 | Fahey | |
| 5,403,236 A | 4/1995 | Greig | |
| 5,408,950 A | 4/1995 | Porto | |
| 5,413,532 A | 5/1995 | Raby | |
| 5,417,458 A * | 5/1995 | Best et al. | 283/107 |
| 5,421,779 A | 6/1995 | Castro | |
| 5,427,832 A | 6/1995 | Longtin | |
| 5,462,488 A | 10/1995 | McKillip | |
| 5,509,693 A | 4/1996 | Kohls | |
| 5,529,345 A | 6/1996 | Kohls | |
| 5,531,482 A | 7/1996 | Blank | 283/67 |
| 5,534,320 A | 7/1996 | Raby | |
| 5,571,587 A * | 11/1996 | Bishop et al. | 283/105 |
| 5,622,761 A | 4/1997 | Cole | |
| 5,640,447 A | 6/1997 | Fonseca | |
| 5,673,943 A | 10/1997 | Campbell | 283/79 |
| 5,776,287 A | 7/1998 | Best et al. | |
| 5,839,763 A | 11/1998 | McCannel | |
| 5,887,899 A | 3/1999 | Dobbins | |
| 5,965,252 A * | 10/1999 | Santo et al. | 428/329 |
| 5,997,042 A | 12/1999 | Blank | 283/61 |
| 6,039,356 A * | 3/2000 | Warther et al. | 283/61 |
| 6,089,611 A | 7/2000 | Blank | 283/67 |
| 6,092,841 A * | 7/2000 | Best et al. | 283/116 |
| 6,153,045 A | 11/2000 | Soltysiak et al. | |
| 6,161,870 A | 12/2000 | Blank | 283/75 |
| 6,179,337 B1 | 1/2001 | Zumberge | |
| 6,217,078 B1 | 4/2001 | Roth et al. | 283/81 |
| 6,219,947 B1 | 4/2001 | Francis | |
| 6,386,591 B1 | 5/2002 | Blank | 283/75 |
| 2002/0089171 A1 | 7/2002 | Silvestre | 283/61 |

* cited by examiner

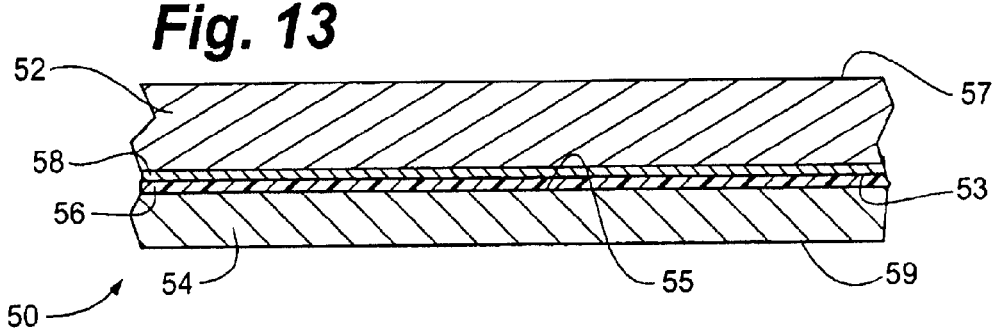
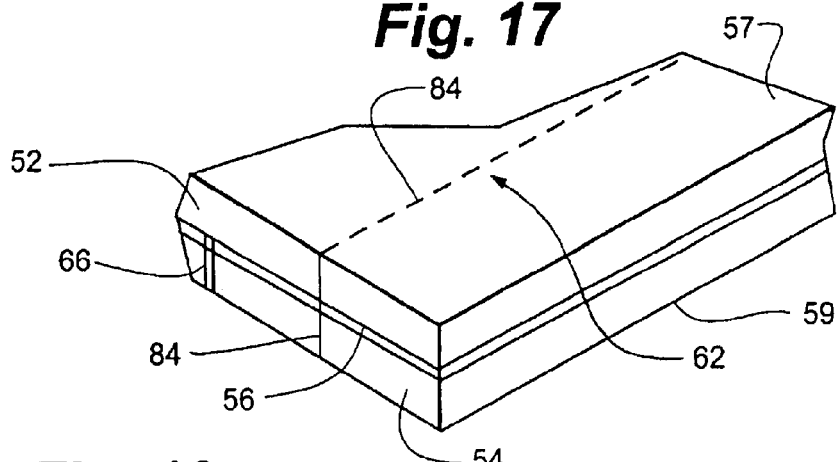
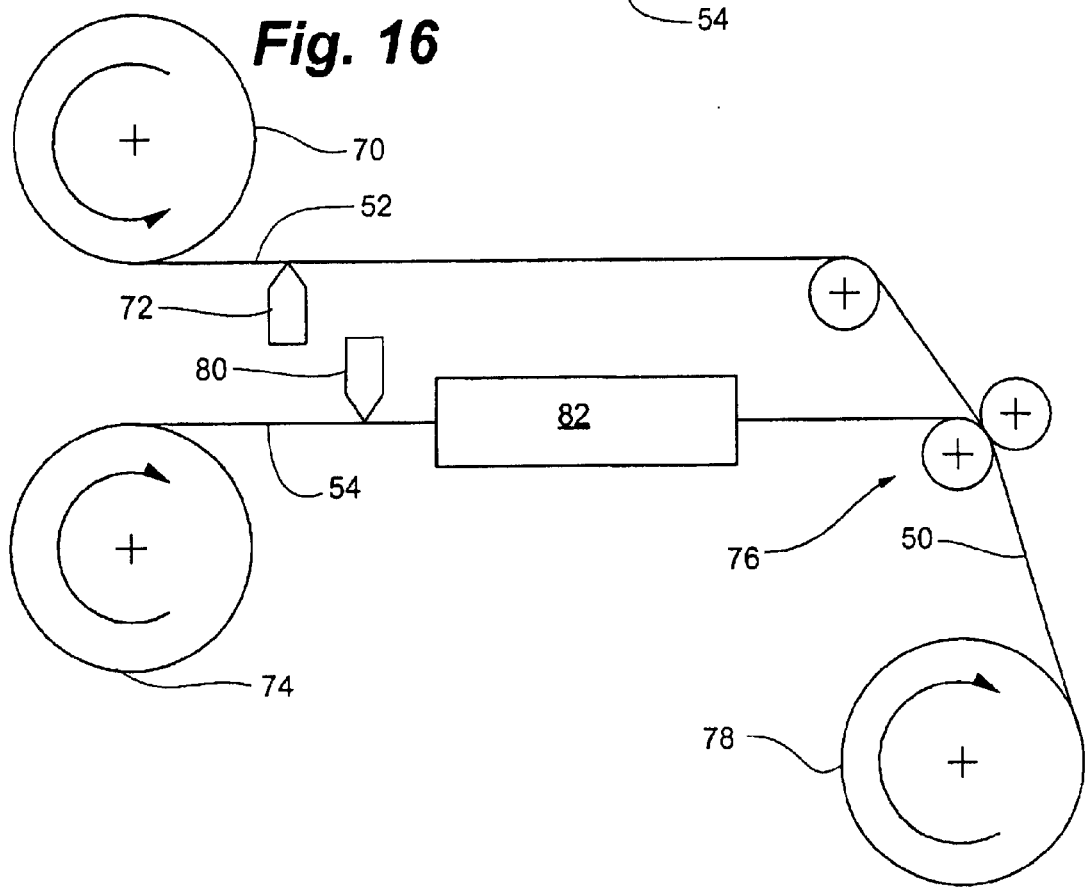

BUSINESS CARD STOCK WITH PEEL OFF LABELS, AND METHOD

RELATED APPLICATIONS

This application is a continuation in part of application Ser. No. 09/561,066, filed Apr. 28, 2000, which is a continuation of application 09/206,886, filed Dec. 8, 1998, now U.S. Pat. No. 6,179,337, which is a continuation-in-part of application 08/986,867, filed Dec. 8, 1997, now abandoned.

TECHNICAL FIELD

The invention relates to business cards, and, in particular, to business cards having removable labels.

BACKGROUND OF THE INVENTION

A wide variety of devices and systems have been proposed for organizing and storing business cards. Many business people receive a number of business cards from a variety of sources as they conduct their business activities. For many people, the business cards are simply dropped in a drawer or left in a pile somewhere on or in a desk, the information on the cards thus being available only with some searching and effort. Other times a business card will be taped in a particular location, such as a file, a personal planner, etc. While this makes the information on the card available when that particular file or planner is being used, the information is not otherwise available or readily at hand, since the business card is essentially a "one use" device—i.e., it presents information in only one place.

One solution proposed for handling business cards is a business card folder or notebook containing, for example, pages of transparent pockets into which cards may be inserted. While these types of organizers can be used to organize the cards, they again present the information only in one place. Many business people do not find the time to maintain such dedicated card organizers. Even with such an organizer, if one needs the information to be available in more than one location, it must be manually copied from the business card to, e.g., a contact list in a personal planner, personal phone list, a file folder, etc.

Business people who work out of more than one office (e.g., either branch locations or even a home office) also experience frustration in not having business card information readily available at each of their office locations. Unless they are very conscientious about maintaining a business card organizer and keeping it with them at all times, they often will find that the information they need is on a business card located at one of their other offices.

SUMMARY OF THE INVENTION

The invention relates to a multiple-use, wallet-sized business card assembly, and to composite sheets and methods for producing such cards. On each card, typically, business card identification information is printed on its top surface. Two or more adhesive-backed removable labels are secured to the bottom surface of the business card, and each of these labels has the business card identification information printed on it. Thus, when a person receives the business card, they may peel off one of the removable labels and place it, for example, in their personal planner. Another label may be peeled off and placed, for example, in a file relating to the person identified on the business card. Yet another label may be peeled off and placed, for example, on a conventional ROLODEX®-style card. The business card itself is still intact, and may be placed in a business card organizer, in the proverbial pile of cards on one's desk, or in any other convenient location. The business card may be of the conventional flat type, or may be of a folded tent-type. The card may also include a release liner beneath the removable labels, the release liner also optionally including additional printed information. Further, a pre-printed and perforated sheet containing several multiple business cards would allow the user to create their own card display information.

The invention further provides for a composite sheet for producing business cards comprising a first and second sheet having confronting surfaces sandwiching between them an adhesive layer. The confronting surface of the first sheet is more easily peeled from the adhesive layer than the confronting surface of the second sheet so that when the sheets are peeled apart, the adhesive layer remains with the second sheet. The composite sheet has a first series of cuts formed in it and configured and arranged in business card shapes, the first series of cuts enabling the composite sheet to retain its integrity as a sheet during a subsequent printing operation but permitting the composite sheet to be easily separated along the first series of cuts into a plurality of business card sized and shaped portions. The second sheet has a second series of cuts formed in it, but not in the first sheet, being so positioned with respect to said first series of cuts as to define a plurality of individually removable labels extending across each business card sized portion. The composite sheet may be printed on both sides and subsequently separated into business card sized portions to provide business cards having printed information on one side and readily removable, adhesive-bearing printed labels on the other side.

The invention further provides a method of producing business cards by providing a composite sheet having first and second sheets having confronting surfaces sandwiching between them a pressure-sensitive adhesive layer. The adhesive layer remains with the second sheet when the sheets are peeled apart. A first series of cuts is applied to the composite sheet dividing such sheet into a plurality of business card size portions in various configurations of cards per sheet. A second series of cuts is applied to the second sheet, but not the first sheet, the second series of cuts being so positioned with respect to the first series of cuts as to define a plurality of individually removable labels extending across each business card sized portion. One may print business card information on each of the business card sized portions of the first sheet and the same or related business card information on the labels, subsequently separating each business card portion from neighboring business card portions to provide a series of business cards.

BRIEF DESCRIPTION OF THE DRAWING

FIG. 13 is a profile view of a preferred embodiment of the composite sheet utilized to create business cards of the invention;

FIG. 16 is a schematic view of a manufacturing operation for manufacturing a composite sheet; and FIG. 17 is a schematic, perspective, broken-away view of a portion of the card stock of FIG. 14.

DETAILED DESCRIPTION OF THE INVENTION

Figure 1:
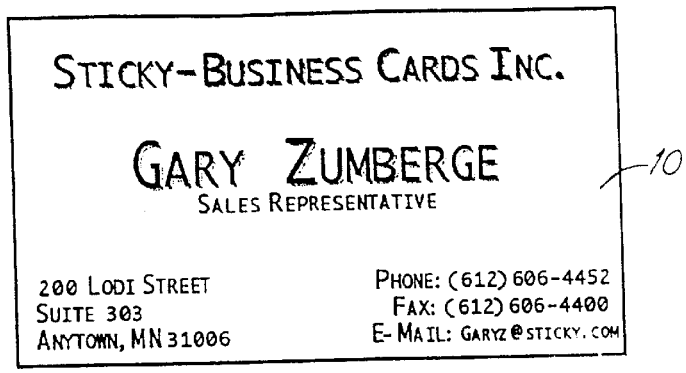
FIG. 1 is a plan view of the top surface of a representative business card of the invention.

FIG. 1 illustrates the top surface of a representative multiple-use wallet-sized business card 10 having the typical business identification information on it. This information includes a company name, an individual's name and title, a mailing address, phone, and fax numbers and an e-mail address. Obviously not all of such identification information need be printed on the card, and other additional information may be included (such as a company logo, home phone, etc.), depending on the desires and needs of the particular individual. Nevertheless, sufficient identification information is printed on the card to make it useful as a business card. Such cards are typically about 2 inches by about 3.5 inches in size, and would not exceed 2.25 by 3.75 inches.

Figure 2:
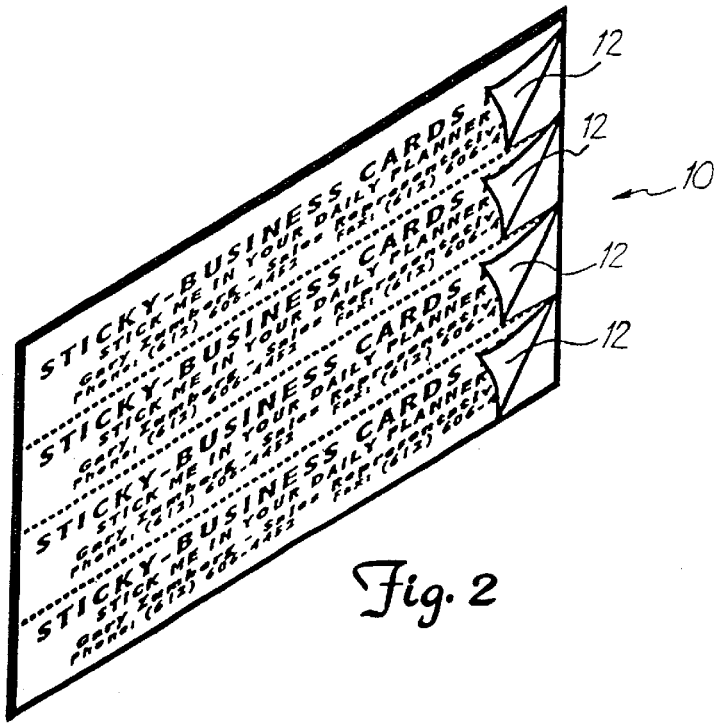
FIG. 2 is a perspective view showing the bottom surface of the business card of FIG. 3.
Figure 3:
FIG. 3 is a plan view of the bottom surface of the business card of FIG. 1.

FIGS. 2–3 illustrate the bottom surface of the multiple-use business card of FIG. 1. Four peel-off labels 12 have been secured to the back of the business card. Each of the labels 12 has business card identification information printed on it. The information on each label 12 may not necessarily include all of the information printed on the top surface of the card 10, but enough of the information is used to at least identify the individual and, desirably how the individual may be contacted. In the embodiment of FIGS. 2–3, the contact information includes the company name, as well as phone and fax numbers. Alternately, an e-mail address, mailing address, or other selected contact information may be placed on the label, depending on the preferences of the individual. As a further variation, one or more of the labels may have one type of contact information (such as phone numbers, which can be placed in a person's personal phone directory) while another one or more of the labels may have another type of contact information (such as a mailing address which can be placed in a correspondence file).

Figure 4:
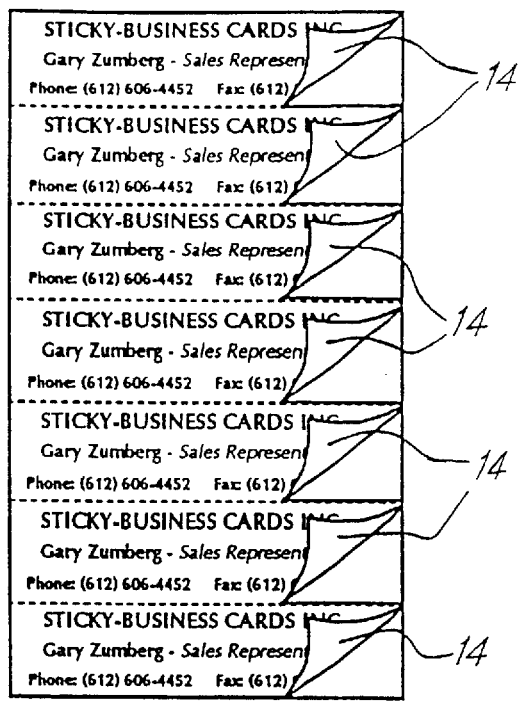
FIG. 4 is a plan view of the bottom surface of an alternate embodiment of a business card of the invention.
Figure 5:
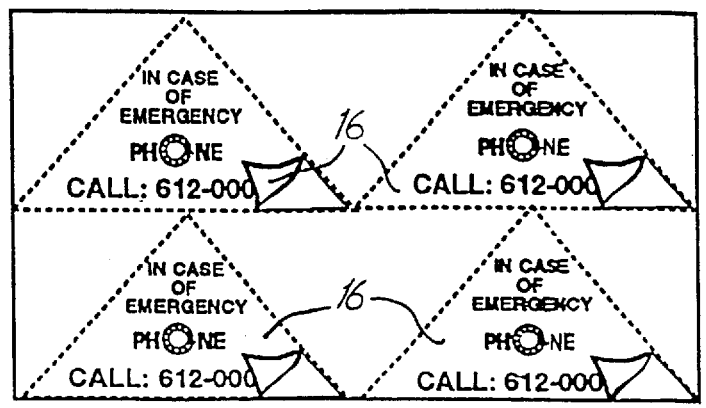
FIG. 5 is a plan view of the bottom surface of another alternate embodiment of a business card of the invention.
Figure 11:
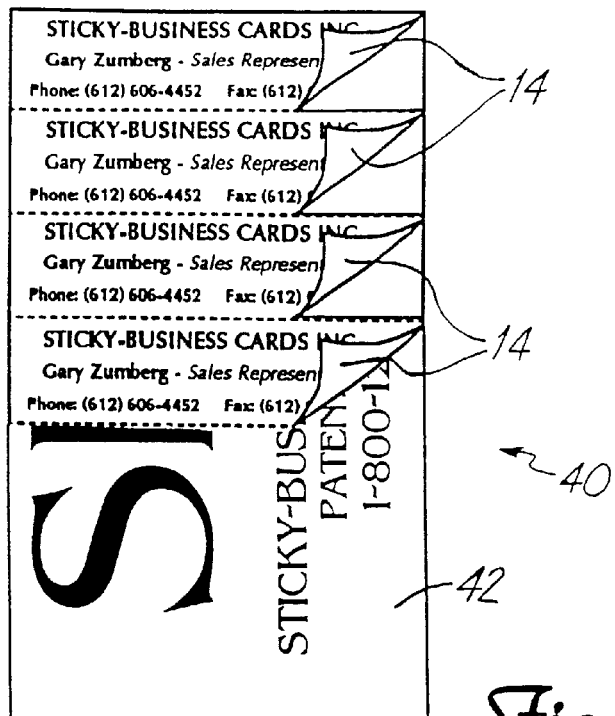
FIGS. 11 and 12 depict another embodiment, which utilizes printing on a release liner.

In FIG. 3 the card 10 is illustrated with four labels 12 extending along the length of the business card 10. FIG. 4 shows a variation in which seven smaller labels 14 extend across the width of the card 10. Other shapes and sizes may also be utilized as desired, such as the triangular labels 16 of FIG. 5. Preferably the entire bottom surface of the card 10 is covered by the labels to present a smooth finished surface, and the labels extend from one edge of the business cards to the other edge. In FIG. 11, the labels are depicted as being rectangular in shape and extending across the narrower width of the card, the labels may extend instead across the longer length of the card, as shown in FIG. 4.

Figure 6:
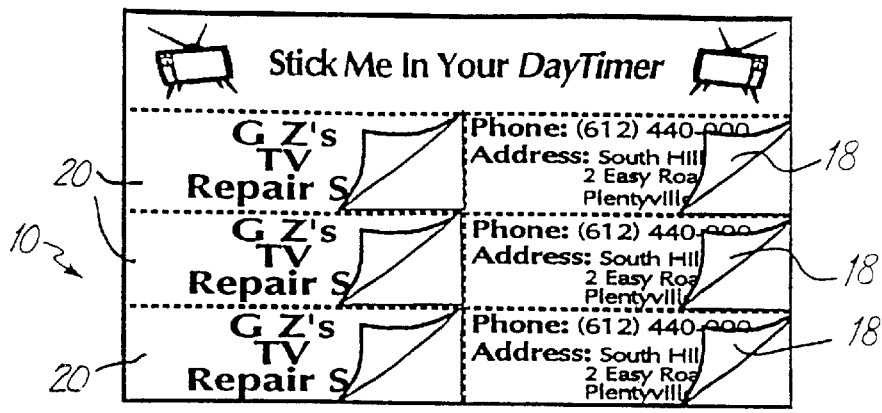
FIGS. 6–9 are plan views of the bottom surface of additional alternate embodiments of business cards of the invention.
Figure 7:
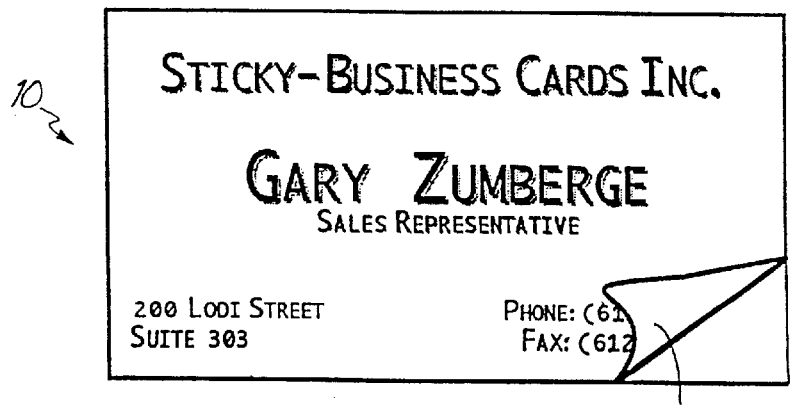

FIG. 6 illustrates yet another embodiment in which three labels 20 are provided with one type of identification information (the company name), and three additional labels 18 contain another type of identification information (phone number and address), giving the recipient of the card 10 additional options in where and how to use the labels. FIG. 7 shows a card in which the label 22 covers the entire bottom surface of the card.

Figure 8:
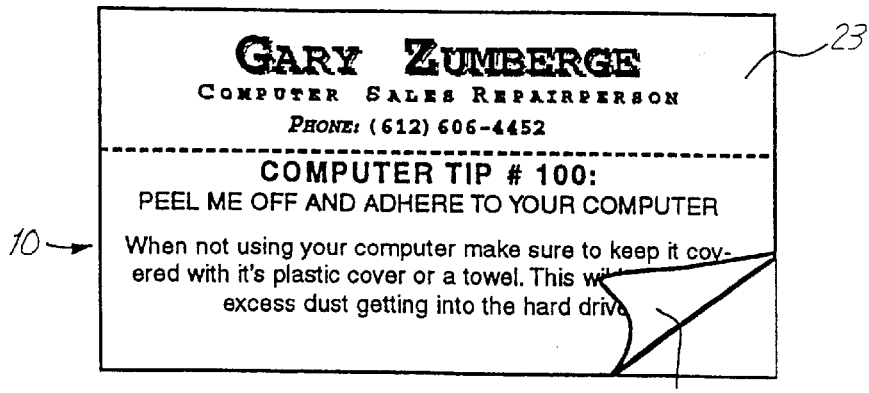
Figure 9:
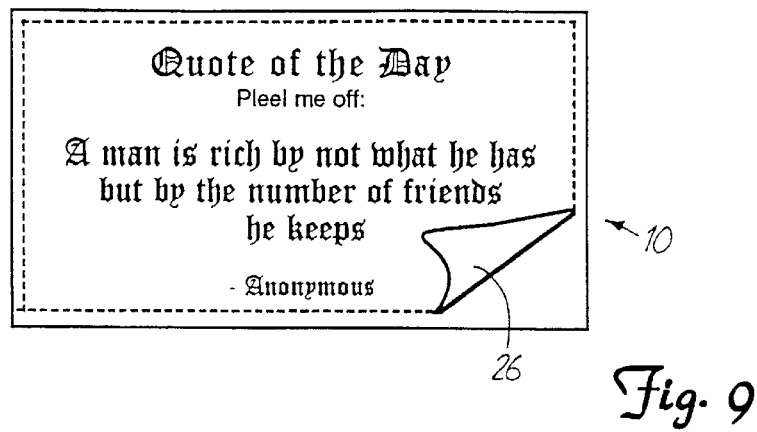

The invention may also utilize other types of information on the labels. For example, FIG. 8 shows a label 23 covering on a portion of the bottom surface of the card 10, and a second, different label 24 containing technical tips that the recipient may place in convenient locations. FIG. 9 shows a label 26 containing other useful information, such as a quote of the day, a joke, or the like.

Figure 10:
FIG. 10 is a perspective view of an alternate embodiment of the a tent-style business card of the invention.

FIG. 10 illustrates an alternate embodiment of the invention in which the business card is a tent-style business card 30. The card is formed from a piece of cardstock having a width and length essentially twice the size of a regular business card (i.e., not more than about 4.5 inches by about 3.75 inches, and typically about 4 inches by about 3.5 inches), so that when the card is folded in half it has a size of a regular business card (i.e., not more than about 2.25 inches by about 3.75 inches, and preferably about 2 inches by about 3.5 inches). The folded card 30, in its folded configuration, has top and bottom outer surfaces 32 and 34, respectively, and an inner surface 36. Business card identification information, including at least an individual's name and contact information identifying how one may contact the individual, is printed on the top outer surface 32.

At least one removable label 38 (and preferably a plurality of removable labels 38) are secured to the inner surface 36 of the card 30, the label(s) 38 including front and back sides and an adhesive applied to the back side to secure the label(s) to the inner surface 36 of the card 30. The label(s) have at least some of the business card identification information printed thereon, preferably at least the individual's name and at least some of the contact information. One or more removable labels may also be secured to the bottom outer surface 34 of the card 30, such label(s) similarly desirably including either some of the business card identification information or other useful information, such as a quote of the day, a joke, other information about the individual or his or her company, or the like.

Business cards in accordance with the invention may be made in a variety of convenient ways. For example, blank card-stock may be prepared with labels preadhered, and such card-stock may then be printed on both sides with the desired information. Alternately, card stock may be printed on one side, and adhesive-backed labels may be separately printed and then secured to the card-stock, either by the printer or by the business person.

Attachment of the adhesive backed labels to the card-stock may be accomplished in any suitable fashion. For example, the adhesive backed labels may be adhered to a suitable release liner, which in turn is securely attached to the card-stock (such as by a suitable permanent adhesive). The user then peels the label off of the release liner, which is left adhered to the bottom of the business card. As desired, the bottom surface of a first sheet may be treated with an easy release coating to which the adhesive does not strongly adhere, and the adhesive coated surface of a second sheet may be applied to the bottom surface of the first sheet. Adhesive-backed second sheets may be used having a repositionable-type adhesive (such as the type used on 3M® brand POST-IT NOTES® and other similar repositionable items), in which case the labels may be attached directly to the card-stock, thereby reducing or eliminating the need for a release liner or an easy release coating.

Figure 12:
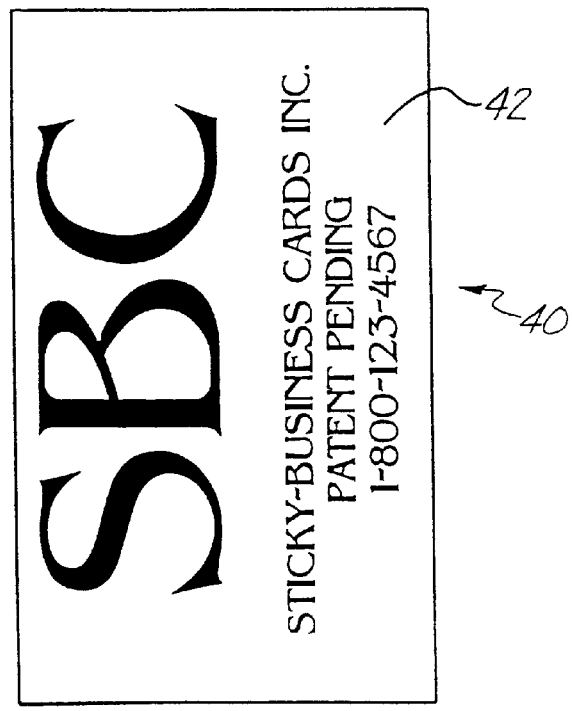

If a release liner is used, then it is possible to also print information on the release liner. This may be accomplished either by printing the information on the outer surface of the release liner, or, more preferably, a transparent release liner is used and the information is printed on the back of the card beneath the release liner (or on the inside surface of the release liner) so that the printing shows through the release liner. FIG. 11 shows the bottom surface of a card 40 similar to that depicted in FIG. 4, except that in FIG. 11 information has been printed on the release liner 42 and a number of the removable labels 14 have been removed, revealing a portion of the information printed on the release liner 42. FIG. 12 shows the bottom of the card 40, with all of the labels 14 removed, revealing the entire release liner 40. Thus, in this embodiment, there are three surfaces on which information may be printed—the top surface, the release liner 42 of the bottom surface, and the labels 14 attached to the release liner 42. If desired, the information printed on the release liner may be different in nature from the information printed on the front surface and on the labels. For example, the release liner may be printed with information identifying a supplier of the business card (e.g., either the printer of the business card, or the manufacturer of the paper stock from which the business card was made, or some other party involved in the manufacture or distribution of the business card). In this event, it may be desirable to print such information on the release liner with less color density (e.g., by using a very light colored ink, or a low percentage screen), so that the information is identifiable to the careful observer but otherwise is unobtrusive (not unlike a watermark on other types of stationery products).

Regardless of the method of construction of the multiple-use business card assembly of the invention, a businessperson receiving a multiple-use business card of the invention may use the peel off labels in a variety of ways. Labels may be peeled off and placed in a personal planner, or in a file relating to the person identified on the business card, or on conventional ROLODEX®-style card, or in any other desired location. Business people with multiple offices may wish to peel off the labels and place them in individual directories that remain at multiple offices, thus making the information on a single business card available to the business person at multiple offices without having to manually copy the information off the card. Moreover, if an acquaintance asks the business person for a referral to one of the business person's contacts, the business person can simply peel off one of the labels from the contact's multiple-use business card and give it to the acquaintance. The business person will still have the original business card from the contact, and the acquaintance will have accurate information about how to get in touch with the contact, all without having to copy the information off of the business card.

With reference to FIG. 13, business cards in accordance with the invention may be made in a variety of convenient ways. For example, blank card-stock 60 (FIGS. 14 and 15) may be produced from a composite sheet 50 manufactured by sandwiching between a first printable sheet 52 and a second printable sheet 54, such as paper sheets, a pressure-sensitive adhesive layer 56 that adheres sheets 52 & 54 together. Production of composite sheet 50 can be done on a continuous basis, using rolls of sheet stock and common adhesive-applying techniques, such as knife or roller coating techniques. A low adhesion, easy-release coating 58, commonly referred to as a "backsize" and typically a material such as silicone to which the pressure-sensitive adhesive adheres poorly, may be coated on the surface 53 of a first of the sheets 52 that faces the adhesive layer 56 formed on the surface 55 of the sheet 54. In this manner, when first 52 and second sheet 54 are peeled apart, adhesive layer 56 will separate cleanly from first sheet 52 due to the low adhesion coating 58 and remain on second sheet 54. Well-known low adhesion coatings, pressure-sensitive adhesives, and related coating procedures may be employed. Composite sheet 50 is shown in cross section in FIG. 13.

In FIG. 16, a web of the first material 52 is drawn from a supply roll 70 and its surface 53 is coated, as by spraying with a sprayer 72, with a low adhesion material. A web of the second material 54 is drawn from a second supply roll 74, and its surface 55 is coated with a pressure-sensitive adhesive solution using, for example, a knife coated 80. The coated material may then be passed through a drying oven 82 or the like, depending on the nature of the adhesive, to cause the adhesive solution to solidify, as by drying or curing, into a tacky, pressure-sensitive adhesive layer 56. As an intermediate step, the adhesive-coated second sheet material issuing from the drying oven 82 may be received on an intermediate take-up roll (not shown), and interleaved with a low-adhesion liner, if desired, for storage before bonding to the first sheet web in a second operation.

The respective coated webs are then brought together and are passed through, e.g., a pair of nip rollers 76 to adhere the low-adhesion surface of the first sheet material to the adhesive-coated surface of the second sheet material, following which the resulting composite material may be received on a take-up roll 78. Various modifications, of course, can be incorporated in the fabricating procedure. For example, the adhesive may instead be coated on the low adhesion surface of the first sheet material, or may be coated on a release liner and later transferred to one or the other of the confronting surfaces of the first and second sheet materials.

Figure 14:
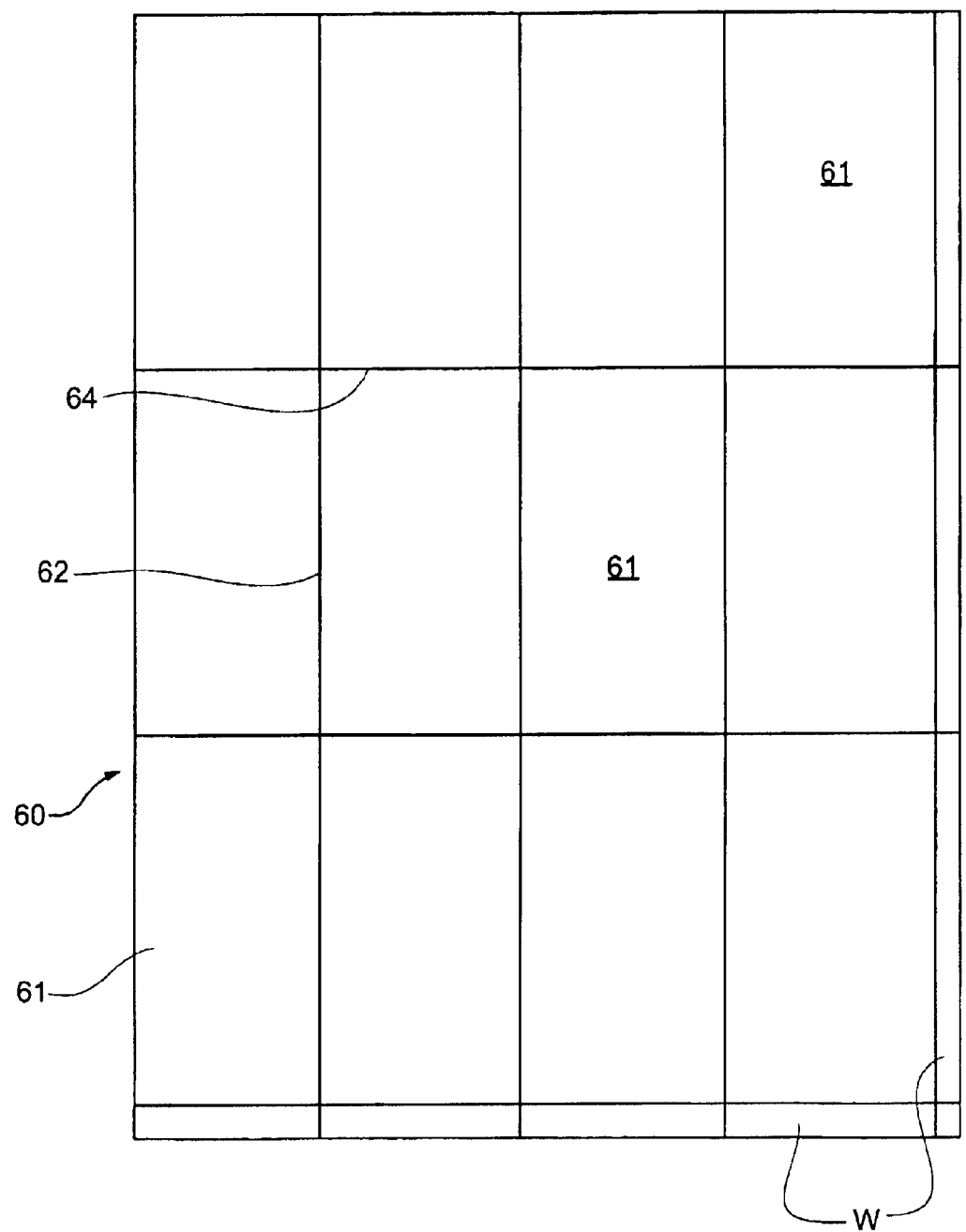
FIG. 14 is a front perspective view of a preferred embodiment of the card stock utilized to create business cards of the invention.

Composite rolled material 50 subsequently is drawn from the roll 78 and is subjected to micro perforating and die cutting procedures, using, as desired, commercially available machines as described below for this purpose. Referring to FIG. 14, the micro perforating operation divides the composite sheet stock 50 into card sheet stock 60, the micro perforations 62 & 64 preferably extending entirely through composite sheet 50, that is, through first and second sheets 52, 54 and adhesive layer 56, and separating the sheet stock into adjacent business card-sized portions 61, the portions being held together by the ties between the perforations as described in further detail below. Second sheet 54 is subjected, in contrast, to a die cutting operation (see FIG. 15) in which die cuts 66 are made through the sheet 54 desirably substantially entirely across the width of the sheet stock to divide the second sheet 54 into a plurality of labels 12. The die cuts extend through the thickness of the second sheet and may extend very slightly into the confronting surface of the first sheet. Each business card-sized portion 61, as defined by micro perforation lines 62 & 64 as shown in FIG. 15, will have, then, a first sheet portion 52 having an outer printable surface 57, and a second sheet portion 54 that has a series of die cuts 66 through its thickness dividing second sheet 54 portion into a plurality of labels 12, the outer surface 59 of second sheet 54 also being printable.

Figure 15:
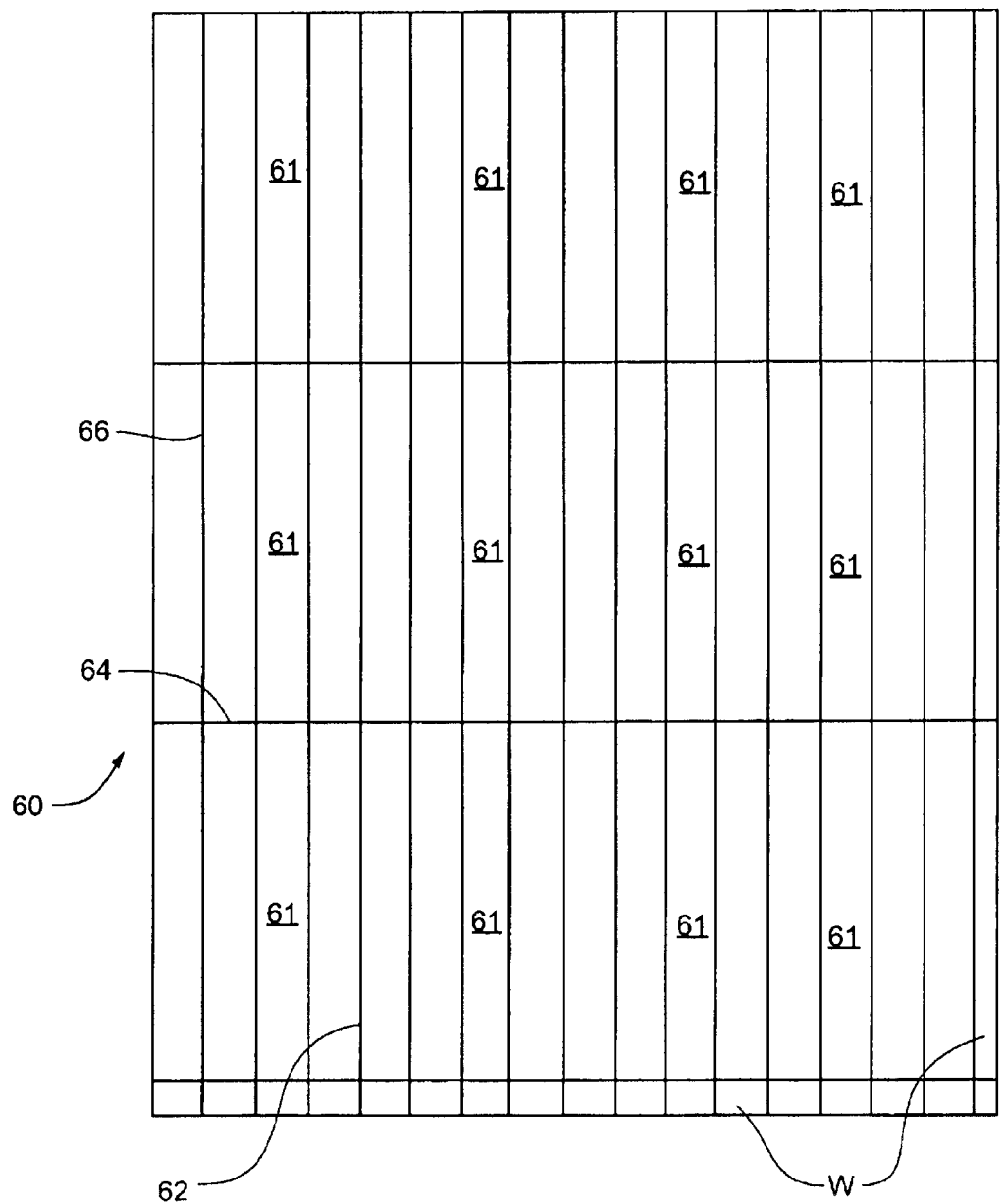
FIG. 15 is a back perspective view of a preferred embodiment of the card stock utilized to create business cards of the invention.

The composite material thus described can be divided, either before or, preferably, after the micro perforating step, by simple cutting techniques into easily managed individual sheets such as standard 8½ inch by 11 inch sizes, as shown in FIGS. 14 & 15, or any other convenient size. As shown in FIGS. 14 and 15, a small amount of wasted material W may be produced at the edges of the standard sheet sizes.

Micro perforation cuts 62 & 64 are such that card stock 60 retains sufficient integrity as to enable it to pass through a printer, such as the digital, ink-jet and laser printers or similar personal computer printers that commonly are used in home computer environments. However, the micro perforation cuts are sufficiently complete (that is, close together) as to enable individual business card portions 61 to be readily separated by hand from one another after a printing operation is complete.

The equipment necessary to create card stock 60 is all commercially available. The basic equipment to which all the components are applied may be a press such as an Aquaflex Instaflex, a Mark Andy 820, an Arpeco Impressionist, or a Webtron press and others. Further, micro-perforating units can be purchased from manufacturers of the presses listed above and others for use in creating card stock 60. The dies used to make the micro-perforations and die cuts may be designed and modified as desired to accomplish the desired micro-perforations and die cuts. Typically, labels 12 will be separated from one another by die cuts 66 that actually sever labels 12 from each other so that they can be easily peeled away cleanly. The micro-perforations 62 & 64 extend all the way through card 61, that is, through both sheets 52 & 54. The die cuts 66 preferably extend all the way to the edges of the resulting cards, enabling the labels to be more easily accessed and grasped by bending the card stock slightly to raise a corner of a label. Moreover, for ease of manufacturing, the die cuts 66 preferably extend substantially completely across the card sheet stock 60.

With respect to micro-perforations 62 & 64, micro-perforating may be performed substantially simultaneously with die cutting on second side 54. The die perforator contains sharp, spaced teeth that make the cuts, and the smoothness of the business card edges that result when the perforations are torn apart depends largely on the length of each perforation and how close the perforations are to each other.

Referring to FIG. 17, the cuts 84 made by the teeth are commonly referred to as "cuts", and the uncut sections 86 of paper between the cuts commonly are called "ties". Ties usually are shorter than cuts. For some perforated materials, the cuts can be 1/16 of an inch long, and the ties between adjacent cuts can be about 1/32 of an inch long. However, for micro-perforated products, the cuts and ties are much smaller. For the present invention, the cuts may be about 0.015 inches long and the ties about 0.010 inches long, the ties preferably having lengths no more that about two-thirds the lengths of the cuts. The cuts and ties can be varied as desired, of course. Micro-perforating is often performed for invoices sent to consumers, such as electric bills, telephone bills, etc., in which a portion of the bill is to be removed and returned with payment. Very fine micro-perforations provide a perforated line that appropriately holds the sections of the bill together but yet enable the sections of paper to be easily separated once the perforated line is sharply creased. The micro perforations used in the present invention provide the resulting cards with smooth edges similar to the edges produced by mechanical cutting.

The cut composite sheet stock 60 can be sold as a product for use in homes or businesses to prepare suitable business cards. For example, as can be seen from FIG. 14, card-stock 60 contains a plurality of cards 61 either preprinted or left blank for the end-user to determine the information content. Each card 61 is separated by at least one vertical micro-perforation line 64 and a horizontal micro-perforation line 62. These perforation lines 62 & 64 allow the user to simply separate an individual card 61 from card stock 60.

A user may first create the information desired to appear on card 61 using a word processing program on the user's home personal computer. Software programs may be chosen to enable the user to create designs, logos, and of course input any business information the user wants to insert on the face of a personalized business card, and similarly to input desired information to be printed on the labels carried on the reverse sides of the cards. After appropriately printing information on the face of the cards, the sheet may be turned over and fed into the printer to enable the labels to be printed. Software may be developed to appropriately position information on the face of the cards and on the labels.

After the printing operation is complete, the user separates the cards from one another by creasing and/or gently tearing the cards apart along the micro-perforated lines. Of course, a user may simply print one card at a time rather than print all the cards on a sheet, create and input different information for each card and its respective labels, etc.

While a preferred embodiment of the present invention has been described, it should be understood that various changes, adaptations and modifications may be made therein without departing from the spirit of the invention and the scope of the appended claims.

What is claimed is:

1. A composite business card sheet stock for producing business cards, comprising:

first and second sheets having confronting surfaces sandwiching between them an adhesive layer, said confronting surface of the first sheet being more easily removable from said adhesive layer than the confronting surface of the second sheet so that when the sheets are peeled apart, the adhesive layer remains with the second sheet, said composite sheet stock having a first series of cuts formed in it and configured and arranged to enable said composite sheet stock to retain its integrity as a sheet during a printing operation but to permit the composite sheet stock to be easily separated into a plurality of business card sized portions, said second sheet having a second series of cuts formed in it but not through the first sheet, said second series of cuts being so positioned with respect to said first series of cuts so as to define a plurality of individually removable labels extending across each business card sized portion;

whereby said composite sheet stock may be printed on both sides and subsequently separated into business card sized portions to provide business cards having printed information on one side and readily removable, adhesive-bearing printed labels on the other side.

2. The composite sheet stock of claim 1 wherein said first series of cuts comprise micro-perforations extending at least through said first sheet and being so sized and arranged as to provide the resulting business card portions with substantially smooth edges.

3. The composite sheet stock of claim 2 wherein said micro-perforations do not extend through said second sheet.

4. The composite sheet stock of claim 2 wherein said micro-perforations extend into said second sheet.

5. The composite sheet stock of any one of claims 1–4 wherein said second series of cuts completely sever each label from an adjacent label.

6. The composite sheet stock of claim 3 wherein said second series of cuts include card cuts aligned with the first series of cuts creating a business card portion on the second sheet.

7. The composite sheet stock of claim 6 wherein said second series of cuts include label cuts completely severing each label from an adjacent label and the card cuts completely severing the business card portion on the second sheet from the adjacent business card portion.

8. The composite sheet stock of claim 1 wherein said composite sheet stock has dimensions of 8.5 inches by 11 inches.

9. The composite sheet stock of claim 1, wherein business card identification information is printed on one side of the business card portions and includes at least an individual's name, and contact information identifying how one may contact the individual and on each of the readily removable, adhesive-bearing labels including at least the individual's name and at least some of the contact information.

10. A method for producing business cards comprising:
   a) providing a composite business card sheet stock having first and second sheets having confronting surfaces sandwiching between them in an adhesive layer, the adhesive layer remaining with said second sheet when the sheets are peeled from each other, said composite sheet stock having a first series of cuts configured and arranged so as to divide such sheet stock into a plurality of business card sized portions, the second sheet having a second series of cuts formed in it but not through the first sheet and so positioned with respect to the first series of cuts as to define the plurality of individually removable labels extending across each business card portion;
   b) printing business card information on each of the business card sized portions of the first sheet;
   c) printing the same or related business card information on the labels; and
   d) separating each business card portion from the neighboring business card portions to provide a series of business cards.

11. The method of claim 10 wherein said first series of cuts comprise micro-perforations extending at least through said first sheet and being so sized and arranged as to provide the resulting business card portions with substantially smooth edges.

12. The method of claim 11 wherein said micro-perforations do not extend through said second sheet.

13. The method of claim 11 wherein said micro-perforations extend into said second sheet.

14. The method of any one of claims 10–13 wherein said second series of cuts completely sever each label from an adjacent label.

15. The method of claim 12 wherein said second series of cuts include card cuts aligned with the first series of cuts creating a business card portion on the second sheet.

16. The method of claim 15 wherein said second series of cuts include label cuts completely severing each label from an adjacent label and the card cuts completely severing the business card portion on the second sheet from the adjacent business card portion.

17. The method of claim 10 wherein the printing of the business card information of said business card portions and on said labels is performed by a user in a home computing environment.

18. The method of claim 10, wherein the business card information includes at least an individual's name, and contact information identifying how one may contact the individual.

* * * * *